United States Patent
Gunnarsson et al.

(10) Patent No.: US 7,130,718 B2
(45) Date of Patent: Oct. 31, 2006

(54) PATHCORRECTION FOR AN INDUSTRIAL ROBOT

(75) Inventors: Svante Gunnarsson, Linköping (SE); Mikael Norrlof, Linköping (SE); Geir Hovland, Ennetbaden (CH); Ulf Carlsson, Södertälje (SE); Torgny Brogardh, Västerås (SE); Tommy Svensson, Fort Collins, CO (US); Stig Moberg, Västerås (SE)

(73) Assignee: ABB AB, Västerås (SE)

( * ) Notice: Subject to any disclaimer, the term of this patent is extended or adjusted under 35 U.S.C. 154(b) by 147 days.

(21) Appl. No.: 10/257,254

(22) PCT Filed: Apr. 9, 2001

(86) PCT No.: PCT/SE01/00784

§ 371 (c)(1),
(2), (4) Date: Jun. 9, 2003

(87) PCT Pub. No.: WO01/76830

PCT Pub. Date: Oct. 18, 2001

(65) Prior Publication Data

US 2004/0093119 A1 May 13, 2004

(30) Foreign Application Priority Data

Apr. 10, 2000 (SE) .................................... 0001312

(51) Int. Cl.
*G06F 19/00* (2006.01)
(52) U.S. Cl. ............. 700/254; 700/193; 700/250; 700/253; 318/568.13; 318/570; 318/571; 318/572; 318/573; 701/23; 701/25; 901/3; 219/124.1

(58) Field of Classification Search ............. 700/245, 700/193, 250, 253; 318/568.13, 570–573, 318/568.18, 568.23, 568.24; 701/23, 25; 901/3; 219/124.1; 414/730
See application file for complete search history.

(56) References Cited

U.S. PATENT DOCUMENTS

| | | | | |
|---|---|---|---|---|
| 4,300,198 | A * | 11/1981 | Davini .................... 700/264 |
| 4,380,696 | A * | 4/1983 | Masaki ................. 219/124.34 |
| 4,403,281 | A * | 9/1983 | Holmes et al. ............. 700/193 |
| 4,675,502 | A | 6/1987 | Haefner et al. |
| 4,920,500 | A * | 4/1990 | Hetland et al. ............. 700/251 |
| 5,006,999 | A * | 4/1991 | Kuno et al. ................. 700/253 |
| 5,303,333 | A * | 4/1994 | Hoos ......................... 700/245 |
| 5,467,003 | A * | 11/1995 | Kosaka et al. ......... 318/568.13 |
| 5,483,138 | A * | 1/1996 | Shmookler et al. .... 318/568.16 |
| 5,572,102 | A * | 11/1996 | Goodfellow et al. ... 318/568.13 |
| 5,727,132 | A * | 3/1998 | Arimatsu et al. ........... 700/259 |

(Continued)

FOREIGN PATENT DOCUMENTS

EP   0 336 342 A2 * 10/1989

(Continued)

*Primary Examiner*—Thomas G. Black
*Assistant Examiner*—McDieunel Marc
(74) *Attorney, Agent, or Firm*—Venable LLP; Eric J. Franklin

(57) ABSTRACT

A method for an industrial robot to increase accuracy in movements of the robot. A first path is formed by bringing a tool supported by the robot to adopt a plurality of generated positions. A plurality of observed positions of the tool moving along the first path are determined. A second path is formed of the determined tool positions. A correction is determined by a path deviation between geometrically determined positions in the first path and the second path.

26 Claims, 11 Drawing Sheets

U.S. PATENT DOCUMENTS 5,887,122 A * 3/1999 Terawaki et al. ............ 700/258
6,134,486 A * 10/2000 Kanayama ................... 701/23
6,356,806 B1 * 3/2002 Grob et al. ................. 700/245

FOREIGN PATENT DOCUMENTS

EP 0 419 670 4/1991

* cited by examiner

PATHCORRECTION FOR AN INDUSTRIAL ROBOT

TECHNICAL FIELD

The present invention relates to a method for an industrial robot. More particularly, the invention relates to a method for obtaining high-precision control of an industrial robot. The method comprises an iterative process, by means of which the absolute accuracy of the robot is tuned by automatic means. The invention also relates to a device and a computer program, by means of which the method is automatically carried out, as well as a computer-readable medium, on which the computer program is stored. By absolute accuracy is meant here that the operating point of the robot is to achieve the absolute position which is indicated in the drawing or a CAD model of the work object, that is, positions defined in the reference coordinate system of the work object.

By an industrial robot is meant a manipulator and a control system. The manipulator normally comprises one to six axes but may also comprise external axes connected to such a manipulator, for example for movement and orientation of a work object, of a tool or of the robot itself. It is also to be understood here that the manipulator may also comprise a plurality of manipulators, which are controlled by the same control system or by cooperating control systems. For example, in such a constellation, a plurality of robots are simultaneously machining the same work object. A further example is that one robot holds a workpiece whereas another robot machines this workpiece.

BACKGROUND ART

In industry there has long been a desire to use industrial robots for processes involving requirements for higher accuracy. Examples of such processes are: laser cutting, laser welding, plasma cutting and water cutting, etc.

However, an industrial robot has a large number of error sources, which in normal cases do not permit the requirements for accuracy, which are made by such processes, to be achieved. The error sources which may occur may be divided into static and dynamic error sources. The dynamic ones may, in turn, be divided into low-frequency error sources and error sources with a large bandwidth.

FIG. 1 shows an example of an industrial robot with three main axes (axis 1–axis 3) and three wrist axes (axis 4–axis 6). A stationary foot 1:1, usually referred to as the base of the robot, supports a stand 1:3 which, by means of a first drive device 1:2, is rotatable around a first axis. The stand supports a first arm 1:5 which, by means of a second drive device 1:4, is rotatable around a second axis. The first arm supports a second arm 1:7 which, by means of a third drive device 1:6, is rotatable around a third axis. The second arm supports a wrist which, by means of a fourth, a fifth and a sixth drive device, is rotatable around axes 4, 5 and 6. The wrist supports a tool 1:9, in which an operating point, called TCP (Tool Center Point), is defined. Each drive device comprises a motor and a gear and devices for controlling and measuring the movement.

FIG. 2 schematically shows how the control of an industrial robot is arranged. The movement of the operating point and the orientation of the tool are defined in a program 2:1, which is interpreted by an interpreter 2:2, which generates reference positions and reference orientations for a trajectory generator 2:3. With the aid of the reference positions and the reference orientations, the trajectory generator interpolates a trajectory comprising a plurality of trajectory parts such as: straight lines, segments of a circle and parabolic trajectory parts. Usually, these trajectory parts are determined in a Cartesian system of coordinates, in which it is desired to define the position of the operating point and the orientation of the tool. By means of an inverse-kinematic model 2:4, the angles that the robot axes should adopt in order to achieve the position and orientation values for the operating point and the tool, are calculated by the trajectory generator. These calculated robot-axis angles are then used as reference signals for the servo units 2:5 of the axes. Each axis has its own servo which controls the motor 2:6 of the axis with the associated gear 2:7. Each gear determines the angle of its axis, and by the mechanical interconnection of the axes according to FIG. 1, the output angular values of the six gears provide the orientation of the tool 2:9 and the positioning of the operating point (TCP) through the kinematics of the robot.

Based on FIGS. 1 and 2, the following error sources occur:

1. Kinematic errors, which are due to the fact that there is a difference between the kinematic model which is used in the inverse-kinematic calculations 2:4 and the real kinematics 2:8 of the robot. Examples of kinematic errors are obliquity of the axes, incorrect axis distances and incorrect axis offsets.
2. Transmission errors, which are due to the fact that the relation between motor angle and arm angle does not correspond. The error may be due to inaccuracy and play in gears, faults in the geometry of articulated rods, for example when using parallel links for transmission of torques to axis 3, etc.
3. Measuring system errors, which, for example, are due to the fact that the angle-reference value corresponding to the axis angle zero is incorrect or that the noise level of the sensor signal is too high.
4. Downward deflection errors, which are due to the fact that gears and arms are not fully rigid. This gives a downward deflection of the robot, which depends on the positions of the robot arms and the weight of the tool. The situation is aggravated by the fact that, for example, gears may have a torque-dependent stiffness value.
5. Calibration errors, which comprise the errors arising when the robot is being installed. Examples of calibration errors are the position errors and orientation errors which arise when the orientation and operating point of the tool are to be measured relative to the mounting plate of the robot wrist and when the position and orientation of the robot foot are to be measured relative to the surroundings of the robot.
6. Dynamic deflection errors, which arise when the servo controls the motor positions. Since measurement is performed only of the motor angle, it is difficult to control the motor such that the arm system moves in accordance with the reference signal to the servo. The situation is further aggravated by the dynamic connections which exist between the axes.
7. Friction errors, which are due to the friction which counteracts the rotation of the motor shaft and the shafts in the gearbox. When the servo controls a shaft and the shaft changes direction of movement, the sign reversal of the frictional torque thus arising adds a torque disturbance to the control. This disturbance causes a transient control action, which generates a path error. If the friction is known, the torque disturbance in the servo may be compensated for. Since the friction is temperature-dependent, depending on the direction of rotation, depending on the magnitude of the transverse forces on the axes and depending on wear, it is very difficult to predict the real value of the friction and how the torque disturbances, caused by the friction, influence the path.

A frequency division of the error sources reveals that the first five error sources in the above list are of a static nature, that error source 6 is a dynamic, low-frequency error source and that error source 7 is a dynamic, high-frequency error source. The technique which is currently used for compensating for the errors described is as follows:

For error sources 1–5, identification of the error parameters (25–100 parameters) of each individual robot is made by measuring the actual position of the operating point for a large number of robot configurations (50–200 configurations) by means of an accurate external measuring system. With the aid of these error parameters, better correspondence may then be obtained between the inverse-kinematic calculations 2:4 and the actual kinematics 2:8 of the robot. Typically, the sum of the static errors may be reduced from the level 7 mm to 1 mm. The fact that it is not possible to make a more accurate compensation of the errors is due to measurement errors in the external measuring system, gear play of the axes of the robot and non-modelled error sources. A considerable problem in this context is that many of the errors are temperature-dependent.

To reduce the effect of error source 6, a dynamic modelling of the robot is made for model-based servo control and axis control. However, it is not possible to obtain sufficient accuracy of the dynamic models, and also with this technique, dynamic path errors of 0.5–1.0 mm of the operating point may be obtained at relatively low speeds (0.1–0.2 m/s).

Finally, attempts are made to reduce the effect of the friction on the axis control (error source 7) by introducing a counteracting modelled friction signal as feedforward or feedback signal in the servo. The friction is then identified by running each axis in a slow movement forwards/backwards, whereby half the difference of the torque reference signals thus obtained is then used as a measure of the friction of the axis. Using this method, the path error due to friction may be reduced typically from the level 1 mm to the level 0.5 mm.

SUMMARY OF THE INVENTION

The object of the invention is to suggest ways and means of manufacturing a control system for an industrial robot, by means of which the accuracy in the movements of the robot is increased. The new control system shall give the robot a final accuracy which is on a level with the repetition accuracy of the robot. This means, for example, that if the robot has a repetition accuracy of 0.05 mm and an absolute accuracy of 8 mm, the new control system shall give the robot an absolute accuracy of better than 0.1 mm. This absolute accuracy is to be achieved when a tool, supported by the robot, moves along a predefined path, where thus the actual tool path shall correspond both with regard to orientation, position and shape. The absolute accuracy shall also be capable of being attained for several robots machining the same work object. The accuracy shall be capable of being tuned automatically and the tuning shall be possible to be carried out at the production site. The method may be used during installation, programming and maintenance of robots and may also be carried out when the robots are being used during production.

This object is achieved according to the invention by means of a method and by means of a control system.

From a first aspect of the invention, the accuracy of the movements of a robot is increased with a method where a reference path is compared with an outcome path. The reference path is created by interconnecting positions generated by the control system. The outcome path is created in the same way by interconnecting positions observed in the measuring system. In this context it should be pointed out that the positions in the reference path and the outcome path do not have to correspond. Usually, considerably more positions are observed in the outcome path than the generated positions in the reference path. The difference between the reference path and the outcome path constitutes the path deviation. In a first embodiment of the invention, the path deviation constitutes the foundation for correction of the control system such that, during a subsequent process, a reference path results in an outcome path having improved correspondence between the paths.

The path deviation is calculated, according to the invention, by forming vectors between geometrically determined positions in the respective path. Above all, such vectors are aimed at, the components of which, in the direction of any of the paths, are of a minimum size. Such vectors are obtained, for example, when these are disposed between positions in the paths which are geometrically calculated from the same path index. The vectors thus formed constitute in themselves a basis for an adjustment of the reference values in the control system. During a parameter adjustment of the drive routines, it is more advantageous to form a mean value of the vectors in an interval around a specific position.

In a preferred embodiment of the inventive method, a tangent is formed to a position in the reference path and a normal plane, associated with this tangent, is formed through the position. Thereafter, in the outcome path, a position falling in this normal plane is interpolated. To this end, various methods may be used for calculation, such as, for example: root-mean-square values, absolute values, mean values, median values or maximum values. Then, from the position in the reference path to the position in the outcome path, a vector is formed, the magnitude and direction of which constitute the foundation for adjustment of parameters and references in the control system.

In a further embodiment of the method, the outcome path is measured by a measuring system associated with the robot. For example, for each position in the outcome path, the axis angles may be read. To simplify the method, a circular reference path is advantageously used, which may preferably be placed such that various drive devices are influenced to a maximum extent. Around positions in the reference path, an interval is formed, the mean values of the differences between the paths being formed over this interval. It is especially preferred to form the mean value over a position in which a drive device changes direction when moving. Owing to friction, a transient is obtained in this part of the outcome path. The value obtained then constitutes a foundation for parameter adjustment of the control of the drive device. According to the invention, the parameter adjustment of values is made in a local coordinate system, which may be a Cartesian coordinate system, and is then transformed to parameters for controlling the speed controller and the current controller of a motor.

In a particularly preferred method, a special trajectory generator is connected to the control system, for generating paths (or trajectories) where a drive device changes direction. The generated paths are preferably circular. At a point where the drive device changes direction, an interval along the circle is formed around the point. The mean value of the path deviations in this interval is formed, and the result is used for parameter adjustment of the drive device.

In an additional advantageous embodiment of the method, the outcome path is measured by an external measuring system. For example, positions in the outcome path may be read with the aid of a laser-based measuring system. In the same way as in the method described above, a vector is formed from a position of the reference path to a position in the outcome path, which vector constitutes a foundation for a reference adjustment of the control system. The position in the outcome path is an interpolated position which ends up in a normal plane to a tangent through the position in the reference path. The external measuring system is also used for simultaneously measuring the workpiece, or a body equivalent thereto for the fixing of the workpiece.

The latter method may, according to the invention, be preceded by an adjustment of the outcome path in two steps. The first step comprises an adjustment of the outcome path with respect to orientation in relation to the reference path. In a renewed method, an outcome path is thus obtained which is correctly oriented in relation to the reference path. The second step comprises an adjustment of the oriented outcome path with respect to the position of the reference path. In a renewed method, an outcome path is thus obtained which is both correctly oriented and with the same position as the reference path. The outcome path, thus oriented and translated, is adjusted according to the above with respect to shape in relation to the reference path.

When orienting the paths, there is formed in each of the paths a vector between geometrical positions in the paths, which have the same interpolation index. When translating the outcome path, there is formed a vector between a geometrically calculated position in each path with the same interpolation index, which vector constitutes a reference for the translation. The translation may also be determined by calculating the centre of gravity for each of the paths and forming the vector between these centres of gravity.

From a second aspect of the invention, the accuracy of the movements of the robot is increased by means of a method which includes the methods described above. In a first part method, an adjustment of the parameters controlling the drive devices is iterated according to the first method. In a second iteration, the result from a first iteration is introduced, the result of which is brought to influence the control system in a third it ration, etc. In a second part method, the outcome path is first iterated with respect to orientation, position and finally shape. In a second iteration, the results obtained from the first iteration are brought to influence the control system, etc. Finally, in order to obtain a higher accuracy, the first method and the second method may be iterated one or more additional times.

All the compensations are made by running the paths programmed for the application, and/or paths of a special type (e.g. circles) which are placed in the vicinity of the paths programmed for the application. In an especially suitable embodiment, also the position and orientation of the work object is measured by the external measuring system. In certain cases it may be sufficient here to accurately measure reference points of the so-called fixture holding the work object. When increasing the accuracy of a plurality of robots controlled by the control system, it is suitable to use the same external measuring system when adjusting all the robots as well as the work object.

According to an additional aspect of the invention, the method is comprised by a computer program, which gives instructions to a processor which executes the method. The computer program is arranged to be stored on a computer-readable medium. The computer program is also arranged to be supplied to the control system via a network such as, for example, the Internet.

BRIEF DESCRIPTION OF THE DRAWINGS

The invention will be explained in greater detail by description of an embodiment with reference to the accompanying drawings, wherein FIG. 1 schematically shows a manipulator with six axes belonging to an industrial robot according to the invention, FIG. 2 schematically shows a control system with a number of components usually included, FIG. 3 schematically shows a control system comprising additional units for calculating software modules for implementation of automatic parameter tuning according to the invention.

DESCRIPTION OF THE PREFERRED EMBODIMENTS

Figure 1:
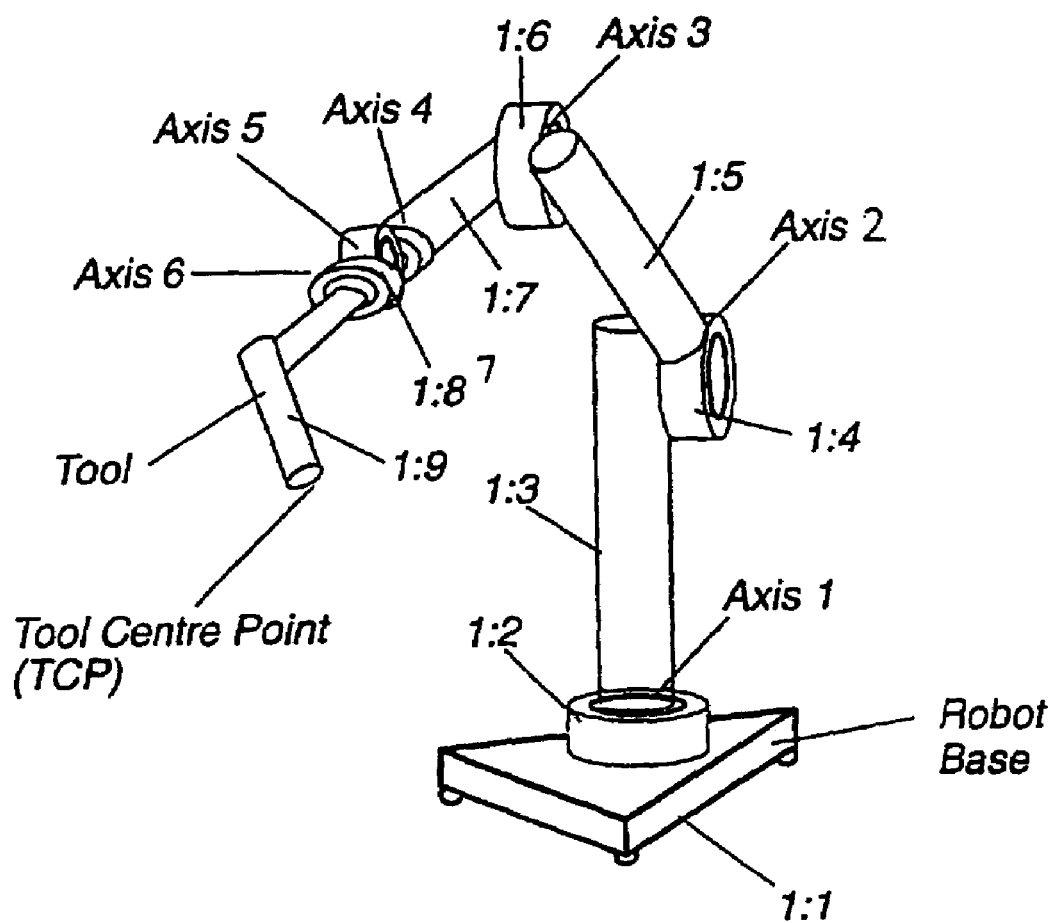
Figure 2:
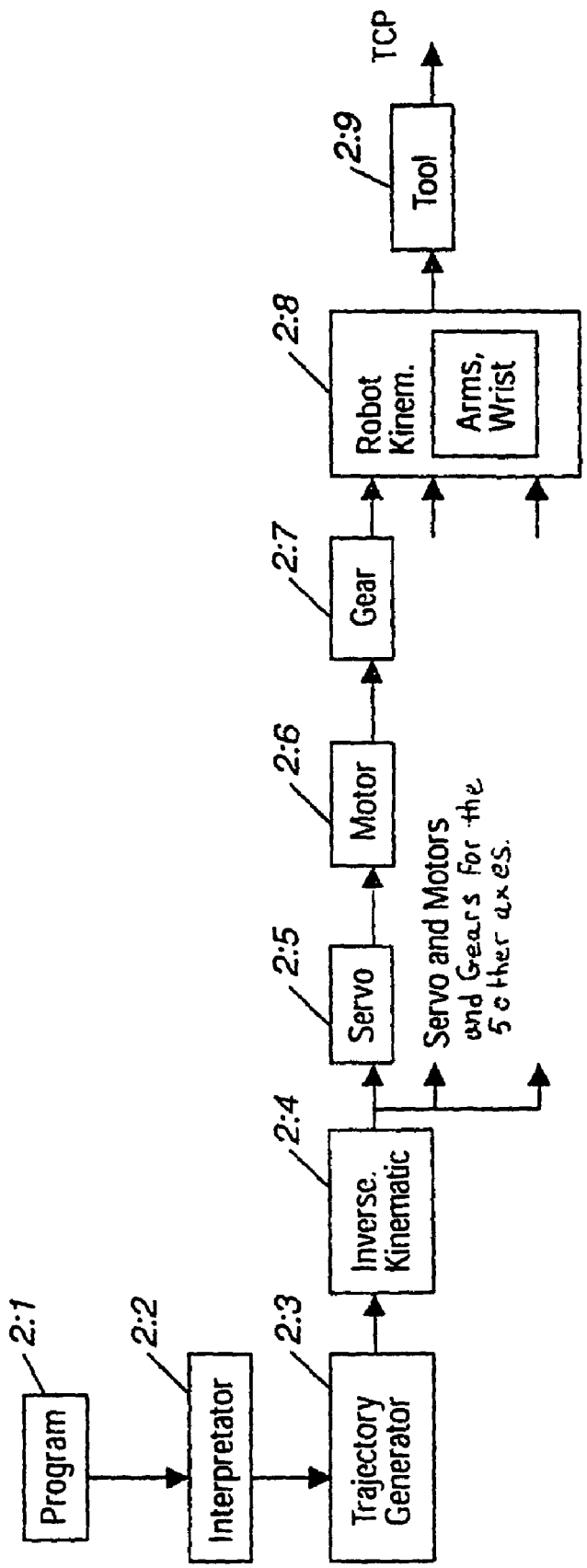
Figure 3:
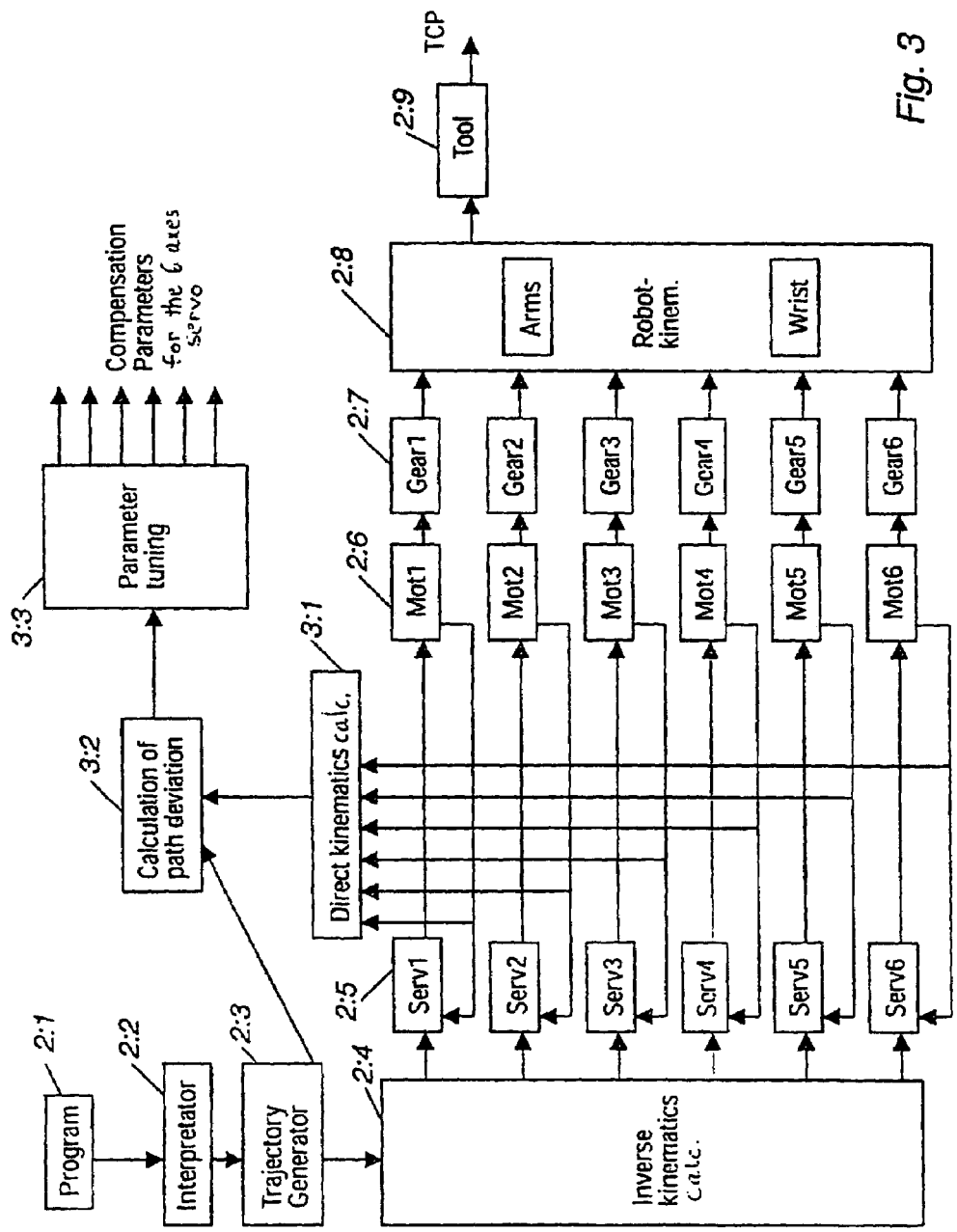

A method for compensation of dynamic broadband error sources according to the invention is shown in FIG. 3, which is an extension of FIG. 2. In FIG. 3 the blocks representing servos 2:5, motors 2:6 and gears 2:7 are shown for all the axes of a 6-axis robot. In the case where the invention is used for other types of manipulators, for example position adjusters having two or three axes, the invention is used for a smaller number of axes, or in the case of coordinated running between the robot and an external manipulator, the invention is used for the axes of both the robot and the manipulator at the same time. From each servo, an arrow extends to the corresponding motor representing the motor torque controlled by the servo, and from each motor a feedback extends to the corresponding servo, representing the measured signal from the axis-angle measuring device of the motor. A module for direct-kinematics calculation 3:1 receives signals from the axis-angle measuring device of the motors for calculating the position the operating point would have had and the orientation the tool would have had if the robot had not suffered from any error relative to the kinematic model which is used in the inverse-kinematics calculation in module 2:4. In a module for calculating the path deviation 3:2, the positions and/or the orientations calculated in the module 3:1 are compared with the desired positions and/or orientations from the trajectory generator 2:3 or from a special trajectory generator. It is of the utmost importance when calculating this path deviation that the positions and the orientations from the direct-kinematics calculations in module 3:1 be compared with the correct corresponding positions and orientations from the trajectory generator 2:3. A module for parameter tuning 3:3 receives the result from module 3:2 and generates compensation parameters for the axes included.

Figure 4:
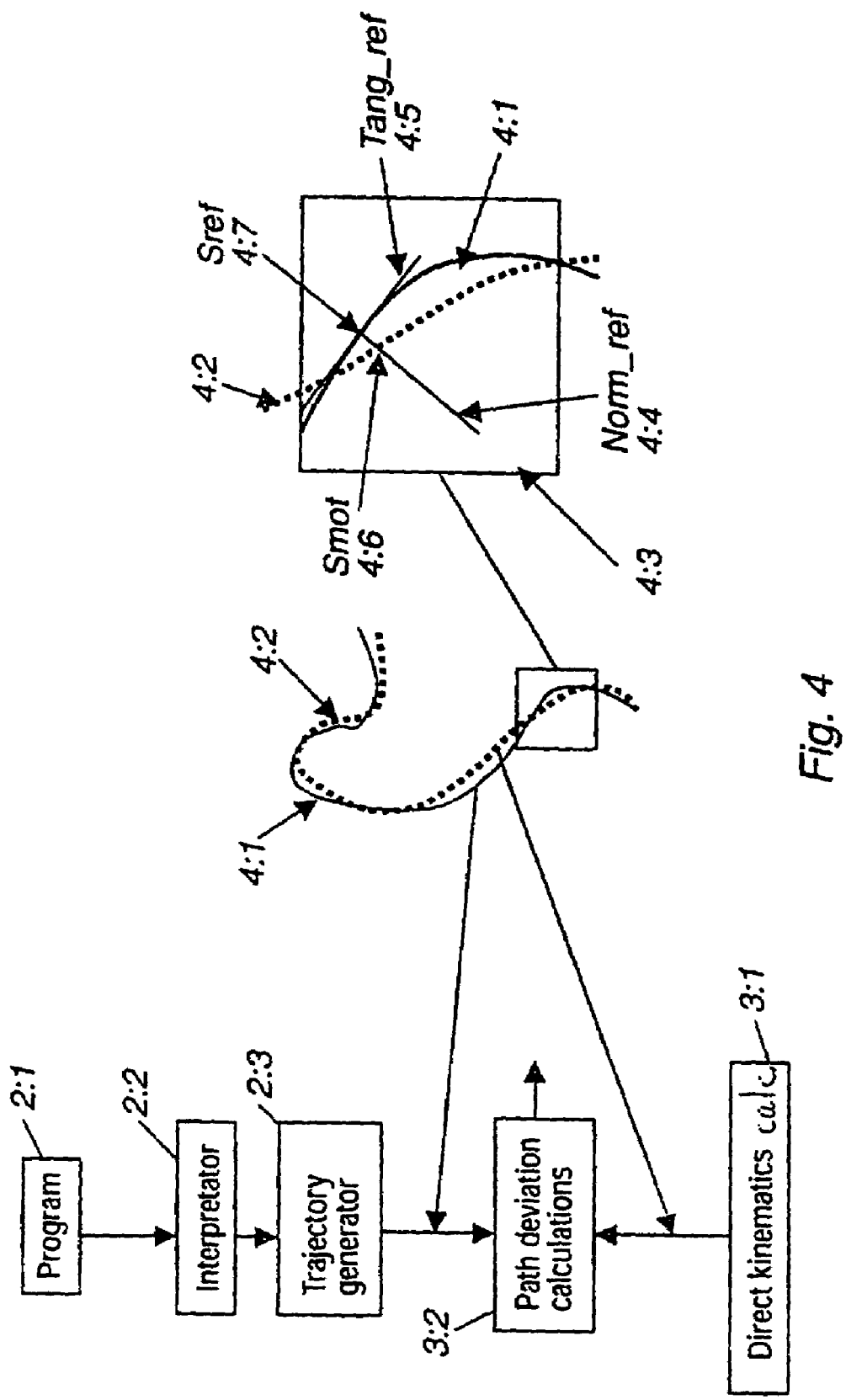
FIG. 4 shows part of a control system and the principle of calculating path deviations for obtaining automatic parameter tuning.

FIG. 4 shows in continuous line a reference path 4:1 generated by the trajectory generator and in dashed line a result path 4:2 generated by the motor axis positions after the direct-kinematics calculations in 3:1. In an enlarged picture 4:3 of the two paths, it is shown how the path deviation is calculated. Actually, the paths 4:1 and 4:2 consist of a sequence of position and possibly orientation values, which may be sampled with different intervals for 4:1 and 4:2. For a given position in the reference path 4:1 with path index Sref 4:7, the tangent Tang_ref 4:5 of the reference path and the plane Norm_ref (4:4) extending through the path point with path index Sref and at right angles to Tang_ref is calculated. In the case where the paths lie in one plane, Norm_ref quite simply is at right angles to Tang_ref in the plane of the paths and at the path point with path index Sref. The path index, also called interpolator index, may, for example, be calculated as the integral of the distance along the path from its starting point. It is, of course, possible, as an equivalent alternative, to start from path 4:2 and for a given path index Smot (4:6) calculate the tangent to path 4:2 and then calculate that plane which is at right angles to the tangent to 4:2.

Now, in order to find the position of the result path 4:2 which relates to the position of the reference path at the path index Sref 4:7, that position of the path 4:2 which lies at the point where the path 4:2 intersects the plane is quite simply calculated, in the 2-dimensional case as that position which lies at the point where 4:2 crosses the tangent Norm_ref in the plane of the path which is common to 4:1 and 4:2. Since the path 4:2 is sampled, it is required that the intersectional point (the crossing) be determined by interpolation between the sampled positions of 4:2. In this interpolation, a mean-value formation over several sample positions of the path 4:2 may be made to make the method less sensitive to noise. In the interpolation, it is furthermore possible to use a least-squares adaptation of polynomials or spline functions in order to calculate, with as high an accuracy as possible, the path deviation between the reference path 4:1 and the motor-generated path 4:2. In the case where the path 4:2 is made the starting-point, a corresponding calculation is made of the intersection between the path 4:1 and a plane which has a tangent to the path 4:2 as normal.

A simpler method, which, however, results in less good accuracy, is to quite simply calculate the difference between positions of the paths 4:1 and 4:2 with the same path index (Sref=Smot). Since path index is normally calculated as covered distance, because of the path deviations of the result path 4:2, the positions being compared will not, in this case, lie orthogonally relative to each other as in the example 4:3 and there is a risk that the compensation results in speed variations along the path. the deviation value is then calculated as, for example, the square sum of the differences between the positions of the paths 4:1 and 4:2 in a number of positions along the reference path with different Sref. The module 3:2 gives as output signal, for example, the total path deviation over the whole path or the path deviations over different parts of the paths. In those cases where it is also desired to control the tool orientation, it is possible, for example, to use the square sum of the differences in the tool orientations of the positions of the paths 4:1 and 4:2 calculated above.

Figure 5:
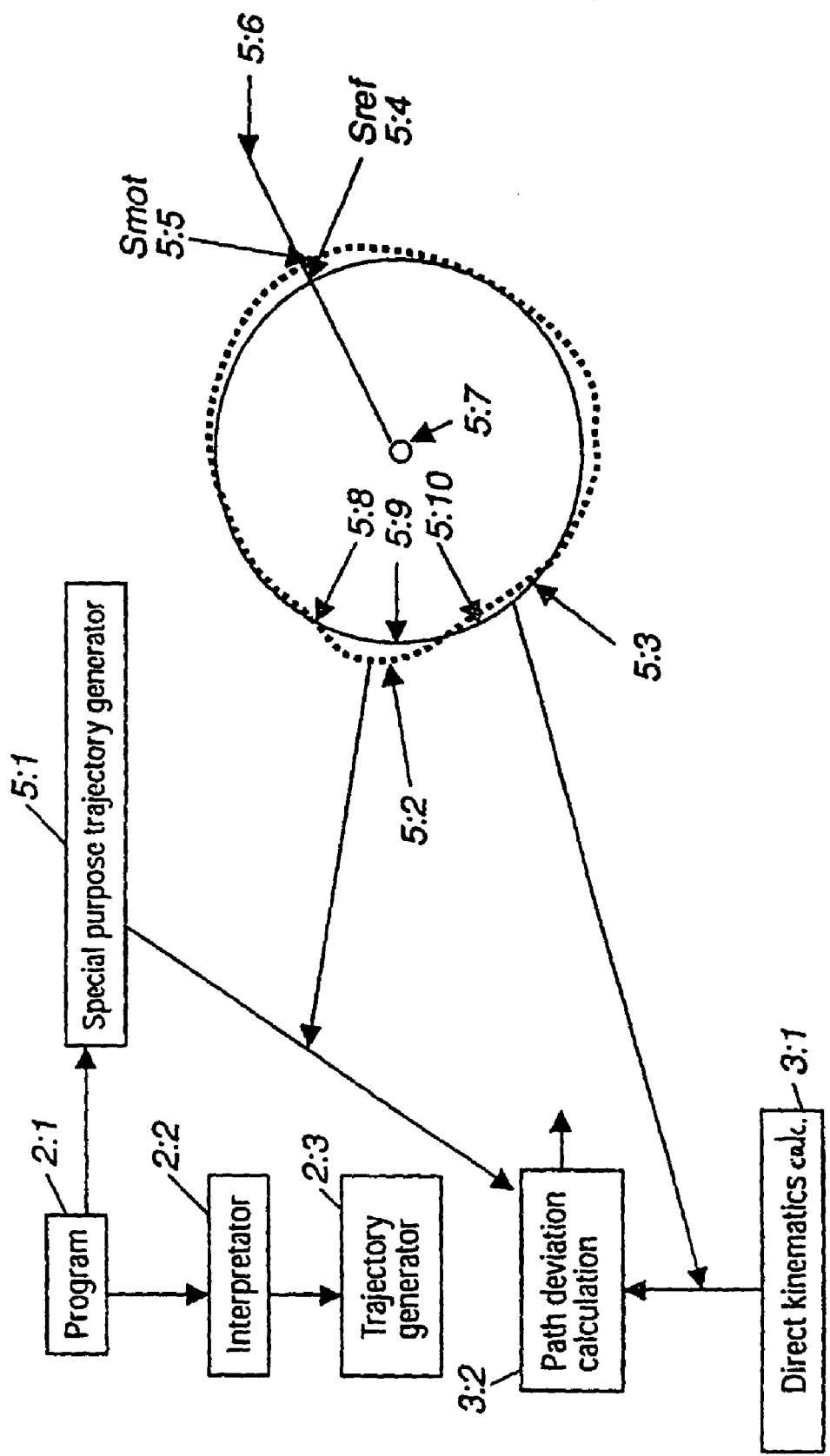
FIG. 5 shows part of a control system and a special case for calculating path deviation during automatic tuning of, for example, friction parameters.

For compensation of the dynamic broadband error sources, and the particularly the friction, it proves that it is often sufficient to use simple closed-loop reference paths such as, for example, circles for carrying out the compensation, although subsequently in the actual production other shapes of paths are run with the robot. For circles, the calculation of the path deviation is simpler and more robust. FIG. 5 shows part of a control system according to the above as well as a circular reference path 5:3 and a result path 5:2. For generation of the reference path, a special trajectory generator 5:1 is used here, which simply calculates that reference circle 5:3 which best corresponds to the result path 5:2 which is generated by the axis angles of the motors from the module for calculation of direct kinematics, 3:1. The reference circle may, for example, be calculated in four steps: first the centre of gravity 5:7 of the path 5:2 is calculated; then the mean normal to the path 5:2 is calculated; thereafter, the plane which has this mean normal as its normal and which passes through the calculated centre of gravity is calculated; and finally, the radius of that circle which lies in the calculated plane, has its centre in the calculated centre of gravity 5:7, and the radius of which is given by the mean radius of the path 5:2, is calculated.

An additional technique which may be used to calculate a reference circle 5:3 in the special trajectory generator 5:1 is to use the parameters which are included in the robot program 2:1. In the movement instructions of the robot for circles and segments of circles, the position and orientation of that coordinate system in which the circle is placed, the position of the centre of the circle, the radius of the circle and the orientation of the circle plane are read. Normally, the circle is arranged in the xy-plane in the local circle coordinate system.

For calculating the path deviation, the difference is formed between the position 5:5 on the result path 5:2 and the position 5:4 on the reference path (circle) 5:3, where the paths intersect a radial line 5:6 to the reference circle 5:3 or possibly to the measured circle 5:2. The mean value of the differences between radially located positions on the two paths is then formed over the different angular values of the radial line 5:6. When determining the position where the path 5:2 intersects the radial line 5:6, mean-value formation, splines-path calculation, etc., may be used in the same way as has been described for the general path in FIG. 4.

FIG. 5 also shows how the path deviation may be calculated in different circle intervals. In the case where compensation of the friction is to be carried out, it is known that a frictional disturbance occurs where the speed changes signs of the relevant axis. On the reference path 5:3 in the figure, such a position is marked by the arrow 5:9. Here, for example, the speed of the servo reference or the measured motor speed changes signs. Around this point, a circle interval is defined between two positions marked by arrows 5:8 and 5:10, where the frictional disturbance gives a transient path error. In this interval, the root mean square value of the radial differences of the positions on the paths 5:3 and 5:2 is, for example, calculated, and this path-deviation value is used for controlling the compensation of the axis whose speed changes signs at 5:9.

Figure 6:
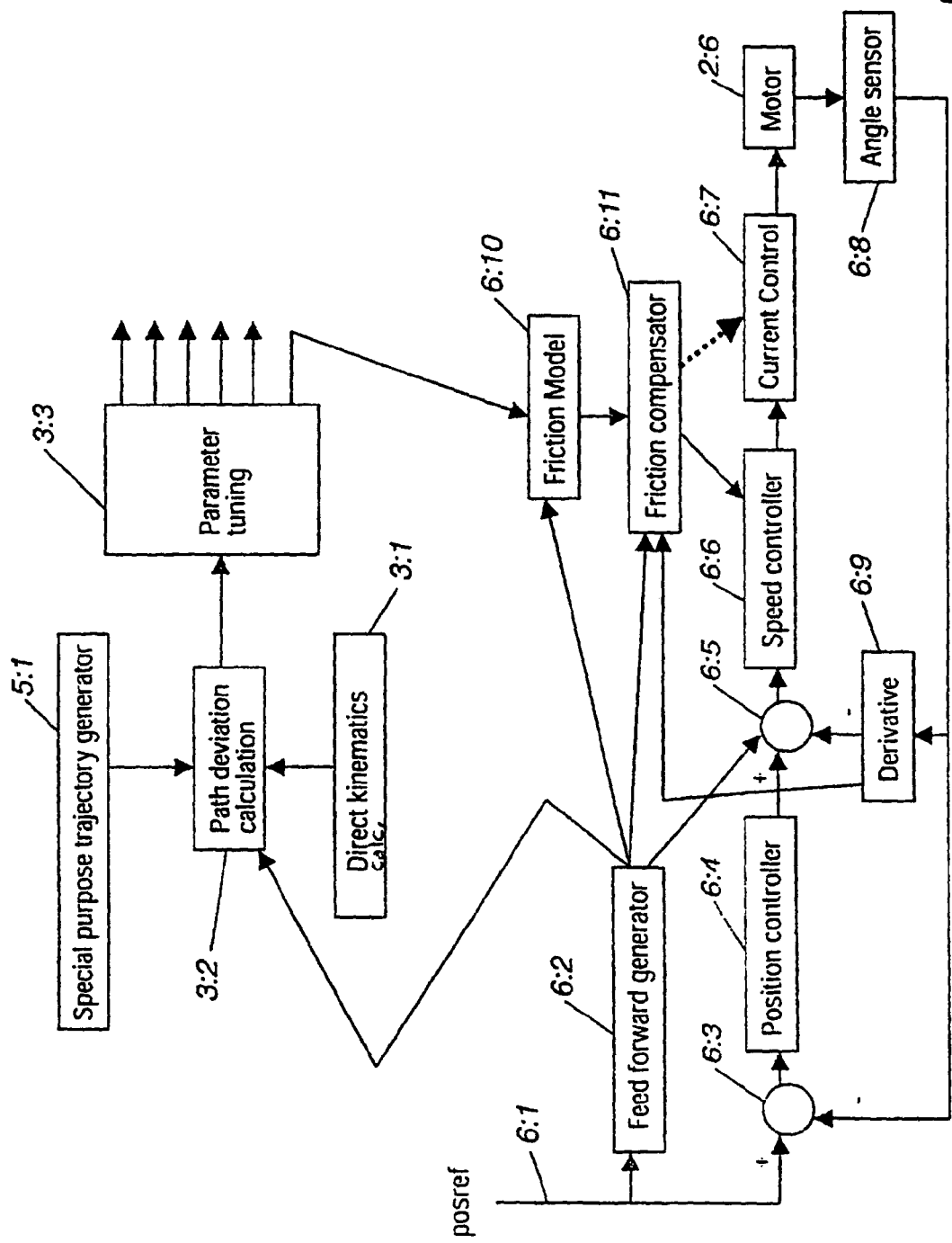
FIG. 6 shows part of a control system with components for automatic parameter tuning and servo functions for control of one of the axes of the robot.

How the path deviation is used for compensating for the dynamic broadband types of error, and then in particular the friction, is shown in FIG. 6. Starting from the path deviation in that path interval in which the relevant axis has changed sign with respect to speed, an adjustment is made, in a friction model 6:10, of those parameters which are to be tuned for minimum path deviation on the motor side. In its simplest form, the friction model consists only of the Coulomb friction and in that case only one parameter per axis needs to be tuned. The friction is then used by a friction compensator 6:11 which, for example, performs a torque feedfoward to the servo with a sign opposite to that of the frictional torque which is generated when the motor shaft changes direction. In the simplest case, with Coulomb friction only, the torque feedforward provides a torque step with a certain time delay relative to the time of the change of sign of the speed of the motor shaft and/or of the speed signal of the servo reference. The speed of the motor shaft is calculated in a differentiating module 6:9 and the speed signal of the servo reference is calculated in a feedforward generator 6:2.

FIG. 6 also shows the control loops for an axis. The position reference (posref) 6:1 from the inverse-kinematic calculations (2:4 in FIG. 3) is used in the feedforward generator 6:2 for generating a speed reference to a summator 6:5. The position reference also constitutes the reference signal to a position controller 6:4. In a difference former 6:3, the position error which controls the position controller is calculated and in the summator 6:5, the speed control error for a speed controller 6:6 is calculated. The output signal from the speed controller constitutes a torque reference for a current controller 6:7, which controls the currents to the motor 2:6. Instead of making the compensation of the frictional disturbances in the speed controller 6:6, this may be done in the current controller 6:7 (torque controller) according to the dash-lined arrow. The position of the motor shaft is measured by an angle-measuring device 6:8 and the speed of the motor shaft is calculated in the differentiating module 6:9.

The compensation according to FIGS. 3–6 is made iteratively for one or several axes at a time. Since different axes change their direction of movement at different parts of the path, the friction parameters of more than one axis may be tuned during the same iterative sequence. This occurs, for example, when the intervals 5:10–5:8 in FIG. 5 are separate for different axes. In the simplest case, the iteration may simply be performed in such a way that a minimum value of the Coulomb friction value is first chosen, which value is then increased from one run to another until a minimum path deviation is obtained for the axis in question. This can then be done for all the six axes of the robot. To reduce the tuning time, a successive approximation method or an adaptive method may be used, where the chosen friction value depends on the preceding result of the changes of the friction value. It is also possible to start with a rough tuning with large steps in the friction parameters, subsequently making a fine tuning around the rough tuning which provided the least path deviation.

These methods with successive adjustment of the friction values provide an iterative learning process, where, based on the experience of which path deviations previously chosen friction values gave, the values of the friction parameters for the next run are determined as optimally as possible.

To compensate for the static and the dynamic low-frequency error sources according to items 1–6, an external measuring system is used which directly or indirectly measures the position of the operating point and possibly the orientation of the tool. Examples of external measuring systems are servo-controlled laser interferometers, theodolites and CCD camera measuring systems. Also mechanical measuring equipment such as, for example, 3D digitizer measuring arms, wire systems and coordinate measuring machines may be useful. There is also a possibility of supplementing an absolute-measuring system by relative-measuring sensors, for example high-stability accelerometers.

Figure 7:
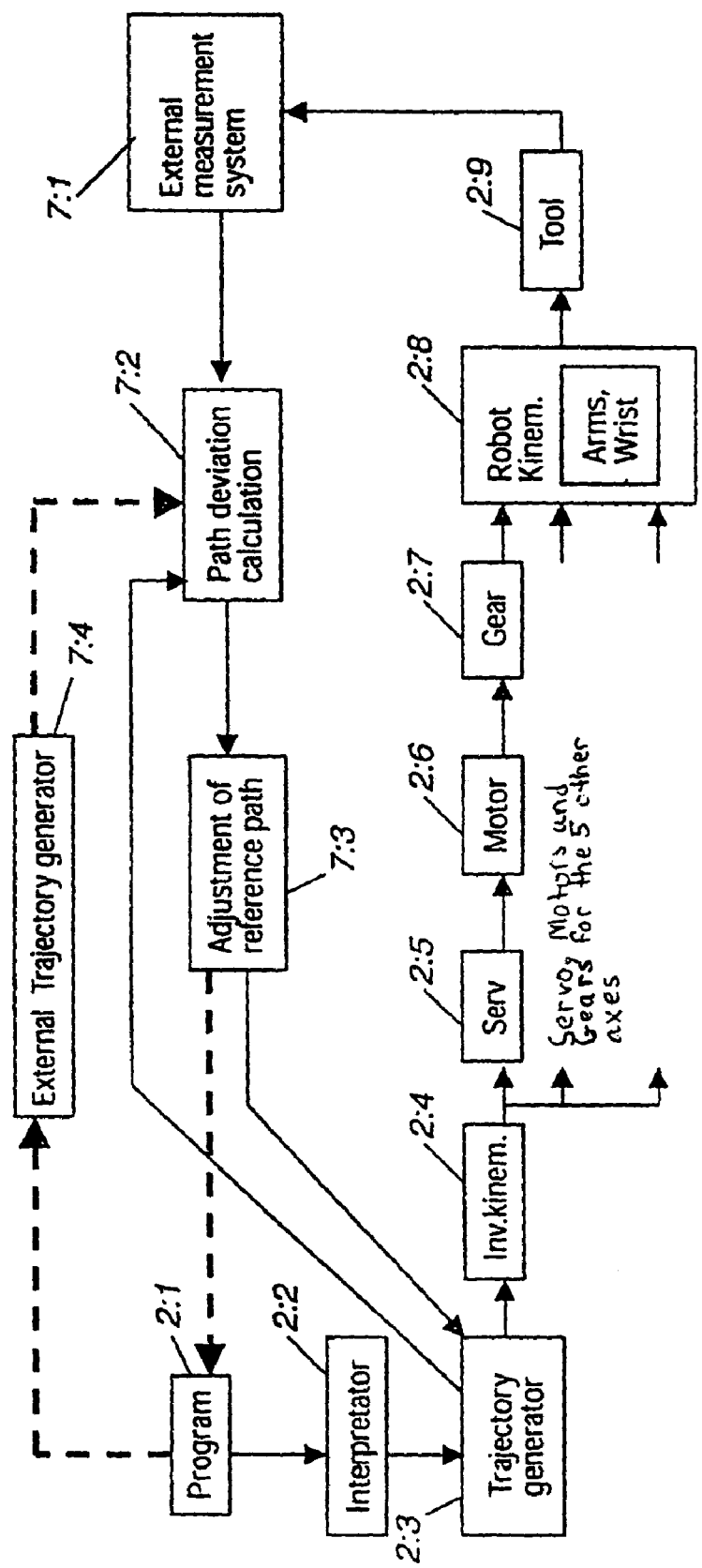
FIG. 7 shows part of a control system with the software modules which are required for implementation of automatic adjustment of the servo references with the aid of an external measuring system.

FIG. 7 shows a control system according to FIG. 2, supplemented by an external measuring system 7:1. The external measuring system measures the position of the operating point (TCP) and possibly the orientation of the tool 2:9 and the measured values are then used for calculating the path deviation in a module 7:2. In this module, the tool positions measured by the external measuring system are compared with corresponding reference positions, which are either obtained from the internal trajectory generator 2:3 or from an external trajectory generator 7:4. The external trajectory generator 7:4 obtains its path-geometry data from the robot program 2:1 or directly from a CAD system. The calculated path deviation is then used by an adjusting module 7:3, which makes an adjustment of the reference path such that the path deviation is minimized. To reduce the path deviation to the level of repetition accuracy, this adjustment often needs to be made iteratively, which implies that the path in question is run more than once and that the reference path is adjusted between each run.

The adjustment of the reference path may be made either by adjusting the path of the internal trajectory generator 2:3 or by adjusting the position arguments of the movement instructions in the program 2:1. It has to be noted that the reference path from the internal or external trajectory generator must not be changed when adjusting the reference path for the servo. This implies that the original reference path must be stored in the program module 2:1 or in any of the trajectory generators 2:3, 7:3, such that this may always, at each iteration, constitute an undisturbed reference path when calculating the path deviation in the module 7:2. It should also be pointed out that the last used and adjusted reference path to the servo should be saved since the calculation of the path adjustment can be made more stable if the reference path to the servo of the preceding iteration is known.

Figure 8:
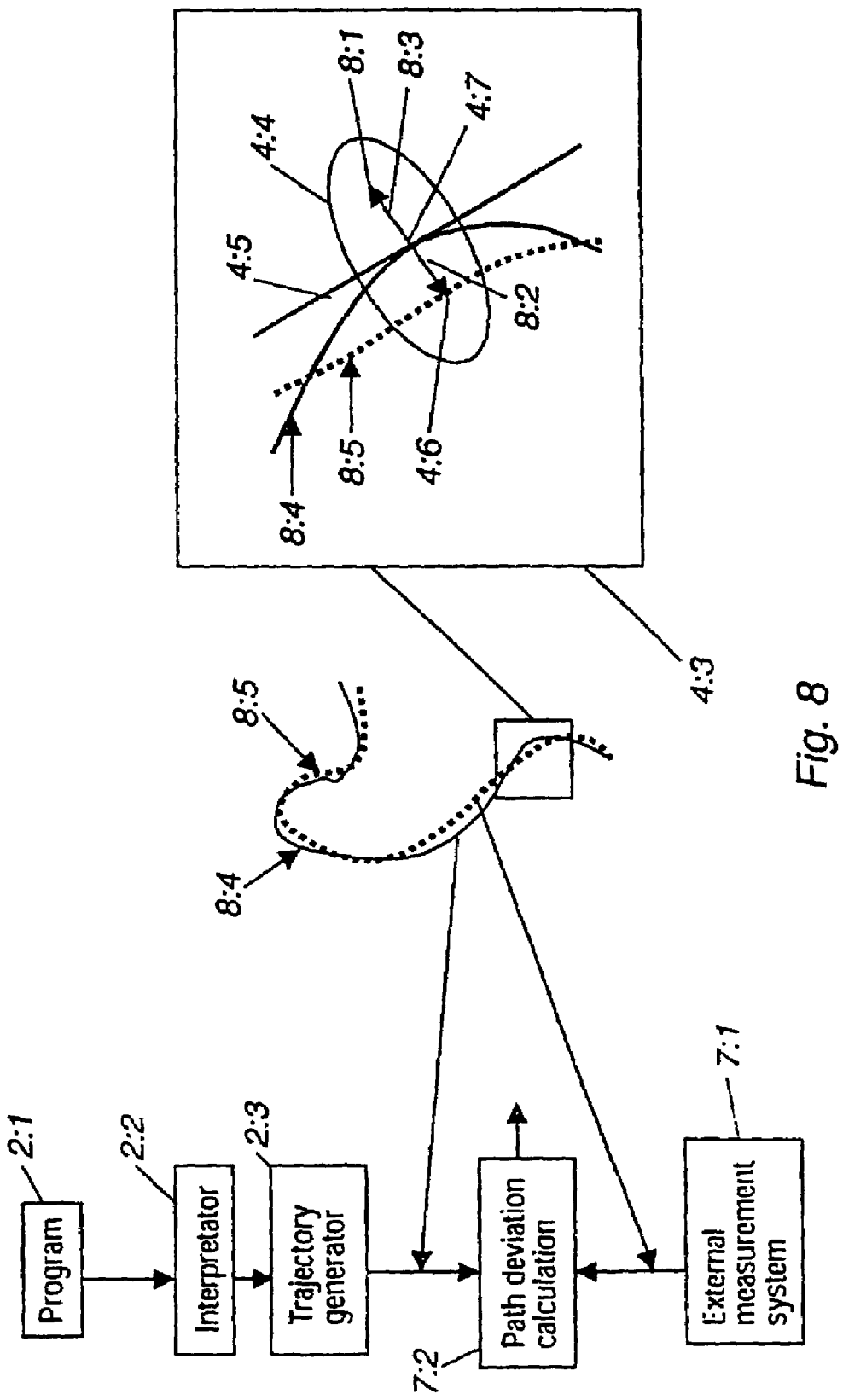
FIG. 8 shows part of a control system and the principle of how to calculate path deviations and path adjustments during automatic adjustment of the servo references.

The calculation of path deviation and path adjustment may be carried out, in principle, in the same way as when compensating for the dynamic broadband error sources according to FIGS. 4 and 5. FIG. 8 shows part of the control system according to FIGS. 2 and 7. FIG. 8 also shows, in unbroken line, a reference path 8:4 and, in broken line, a measured path 8:5. The reference path 8:4 is generated from the internal 2:3 or external 7:4 trajectory generator and the measured path 8:5 is the result of measured values from the external measuring system 7:1. In the same way as in FIG. 4 and as shown in the enlarged picture 4:3 in FIG. 8, the tangent 4:5 to the reference path 8:4 is calculated in that reference position 4:7 which is to be the starting point of the path adjustment. Thereafter, the plane 4:4 which has the tangent 4:5 as a normal, and in which the reference position 4:7 is positioned, is calculated. The next step is to calculate the position of the intersection point 4:6 between the measured path 8:5 and the plane 4:4. The path deviation is then the vector 8:2 between positions 4:7 and 4:6. It should be pointed out here that, in the case of circular paths, the same method as was described for the friction tuning in FIG. 5 may be used for calculating a radial path deviation.

The adjustment of the reference path which is then made in 7:3 is given by a vector 8:3, which is directed opposite to the path-deviation vector 8:2 and which has a length which is a function of 8:2 and possibly also a function of path-deviation vectors before and after the position 4:7. In its simplest form, the length of 8:3 is as large as the length of 8:2. The vector 8:3 then defines the reference position 8:1 which is sent to the trajectory generator 2:3 or the program 2:1. If the calculated reference positions 8:1 do not end up in consecutive order, that is, with rising path index Sref, along the new reference path, an after-calculation is made of the new compensated reference path. This after-calculation consists of sorting the reference positions 8:1 such that they are always positioned with rising path index and such that the distances between the positions are equalized.

In the case that also the tool orientation is to be adjusted along the path, then in each reference position 4.7, the tool orientation of the reference point may be compared with the measured tool orientation from the external measuring system 7:1. Depending on how the tool orientation is defined, the orientation error is calculated, and this error with changed signs is then added to the orientation of the reference path to obtain the orientation of the reference path in the next iteration. It should be pointed out here that an adjustment of the tool orientation at the same time gives a position error. One possibility of solving this problem is to first iterate with respect to the tool orientation such that this becomes correct and then to iterate with respect to the position of the operating point. In the case of Euler angles, the adjustment of three angles of rotation is defined, and in the case of quaternions, the adjustment of one angle of rotation and the unity coordinates of the axis of rotation are defined.

Figure 9:
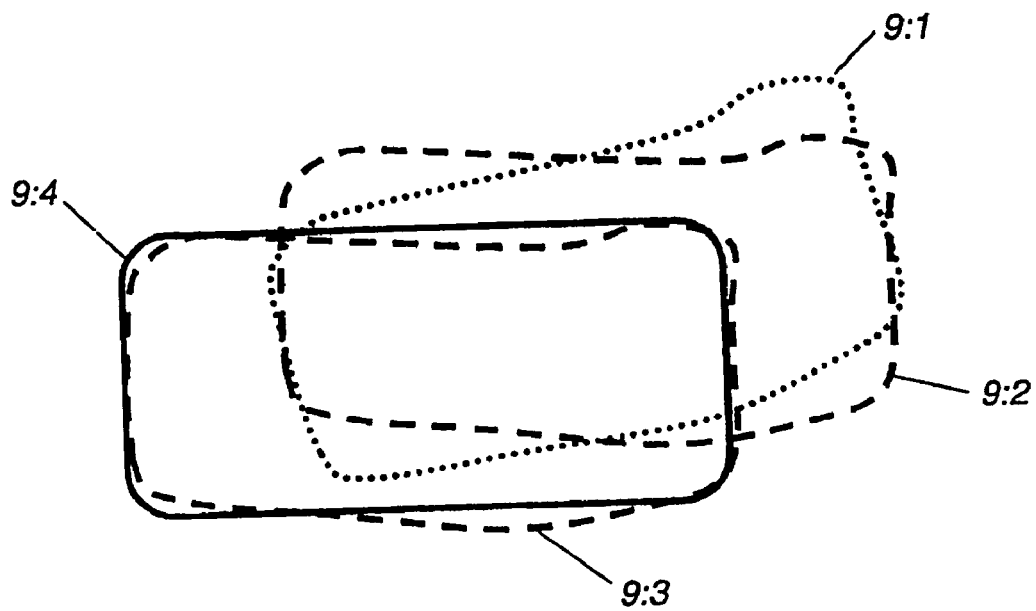
FIG. 9 shows an example of how to carry out adjustment of the reference path in an orientation step, a translation step and in a shape adjustment step.

In case of large path errors, it is difficult to calculate the vector 8:2. According to the invention, the calculation of the path deviation in 7:2 and the adjustment of the reference path in 7:3 are made in three steps for each iteration, which is shown in FIG. 9. In a first step, the path deviation is calculated with respect to the orientation of the path and the orientation of the original path 9:1 is adjusted to correspond to the orientation of the reference path 9:4, thus obtaining an oriented path 9:2. In a second step, the oriented path 9:2 from the first step is translated until the path deviation with respect to the position of the path 9:2 in relation to the position of the reference path 9:4 becomes as small as possible, whereby a translated path 9:3 is obtained. In a third step, the path deviation is formed between the translated path and the reference path, whereby the reference path itself is obtained. The method described in FIG. 8 may be used in that connection. During iterative path adjustment, all the three steps may be used in the first iteration, whereas in subsequent iterations it may be sufficient to run only step three.

Figure 10:
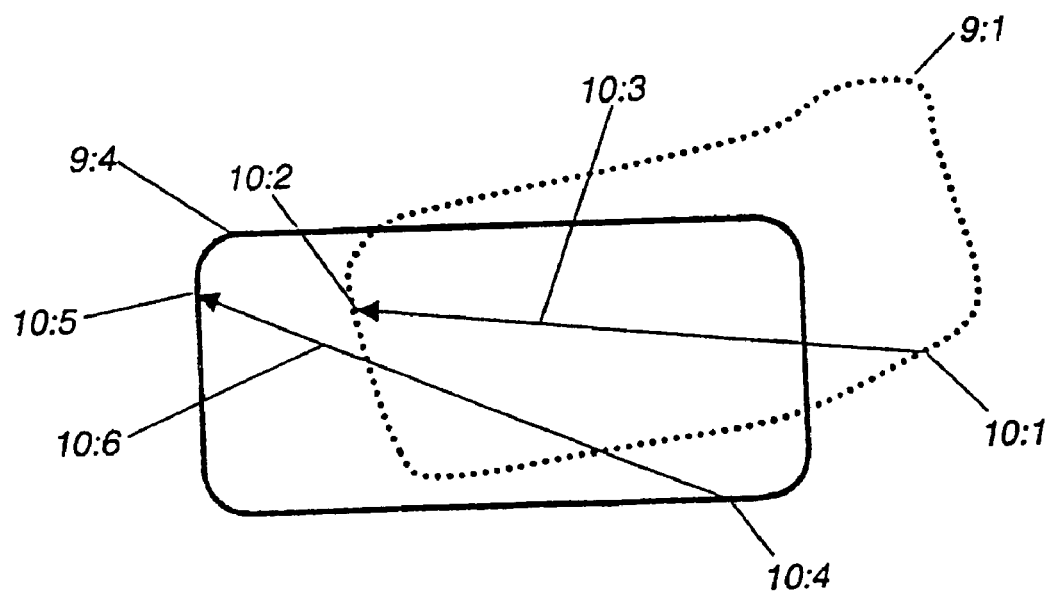
FIG. 10 shows an example of the principle for calculating the adjustment of the reference path with regard to orientation.
Figure 11:
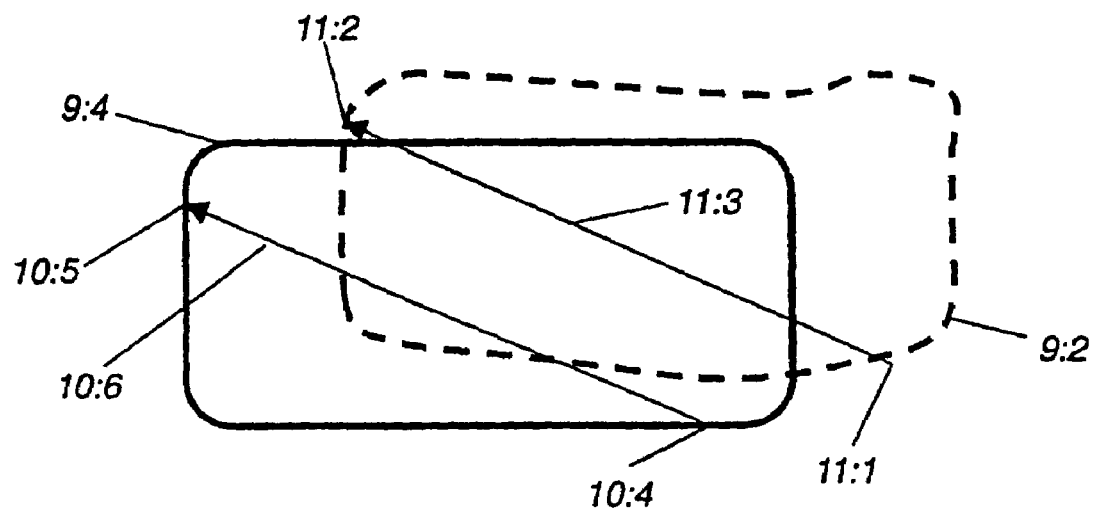
FIG. 11 shows an example of the principle for calculating the adjustment of the reference path with regard to translation.
Figure 12:
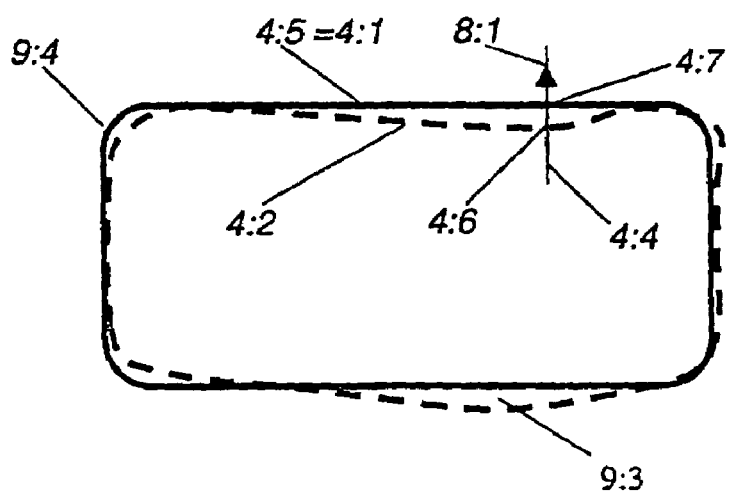
FIG. 12 shows an example of the principle for calculating the adjustment of the reference path with regard to shape.

FIGS. 10–12 show in more detail how the three steps for calculating path deviation and for path adjustment are carried out. In step one, according to FIG. 10, two positions 10:4 and 10:5 with a sufficiently great difference in interpolator index (Sref1, Sref2) are first calculated. The vector 10:6 between the positions 10:4 and 10:5 now defines the orientation of the reference path. Then, the positions 10:1 and 10:2 corresponding to the interpolator indices Sref1 and Sref2 are calculated for the measured path 9:1, and the directional vector 10:3 of the measured path may be calculated. As previously mentioned, the path length calculated from the starting point of the path may be selected as interpolator index. If there are paths for so-called lead-in and lead-out with the intention of running smoothly into and out of a closed path, the start and stop positions of the lead-in and lead-out paths, respectively, may quite simply be used for the positions 10:1 and 10:2. The path deviation in step one is calculated from the orientation difference between vectors 10:6 and 10:3. This orientation difference may be represented in different ways, for example by Euler angles, quaternions etc. The path deviation for all the measured points in step one is obtained as the difference between the path deviation in the original path 9:1 and the reoriented path 9:2.

In step two, according to FIG. 11, a translation of the rotated path 9:2 to the position of the reference path 9:4 is made. The translation vector may be calculated as a vector between two path positions with the same interpolator index of the two paths, for example between the positions 11:2 and 10:5 or as the mean value over several such vectors for different interpolator indices. Another possibility is to calculate the centres of gravity of paths 9:2 and 9:4 and then to define the translation vector as the vector between these centres of gravity. An additional possibility is quite simply to calculate the maximum and minimum values of the paths in the x-direction, the y-direction and the z-direction and then to define a translation vector as the difference between the maximum values and the minimum values in the three directions of coordinates. The path deviation is then defined by the translation vector.

Figure 13:
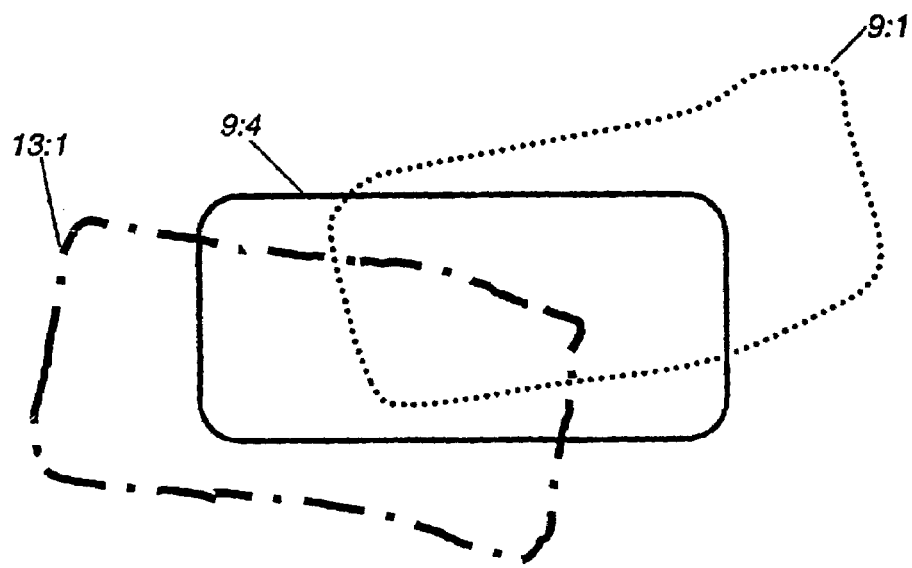
FIG. 13 shows an example of how the stored-together adjustments result in an inverse reference path.

In step three, there is then used according to FIG. 12 the method according to FIG. 8 for calculating the path deviation of the reoriented and translated measured path 9:3 relative to the reference path 9:4. It can be said that this step calculates the shape error of the path whereas step one calculates the orientation error of the path and step two calculates the position error of the path. When these three error contributions are known, the new reference path may be calculated and the approximate appearance of this reference path for the described case is shown in FIG. 13. For the operating point to follow the reference path 9:4, an adjustment is made which is the inverse of the sum of the path deviations in steps 1–3. This means that an opposite reorientation of 9:1 is first made, then a translation directed opposite to the reference path 9:4, and finally a adjustment of the path shape according to the method of FIG. 8. In the described case, a new reference path 13:1 is then obtained. This reference path 13:1 will be used in the next iteration as a reference for the axis servos. However, the original reference path 9:4 will always be used as a reference path for calculating the path deviations.

It should be pointed out that, instead of rotating, translating and shape-adjusting the measured path 9:1, it is possible to calculate the path deviation and the path adjustment by rotating, translating and path-adjusting the reference path 9:4 until this corresponds to the measured path 9:1.

In the following, it is shown how the three steps may be implemented in the case where the path adjustment is made in one plane (the xy plane in a path coordinate system). Allow the positions on the reference path to be denoted by the ending _r and by position index j, and positions on the measured path to be denoted by the ending _m and by position index i, which gives the position coordinates (x_r, y_r,z_r) and (x_m,y_m,z_m) of the reference path and the measured path, respectively.

For the calculation of the angle of rotation between two vectors (10:3, 10:6) which extend between the start and end positions of the path (according to step 1), the following expression is then obtained:

$$\alpha\_rot = \tan^{-1}\left(\frac{y\_r_{j\_end} - y\_r_{j\_begin}}{x\_r_{j\_end} - x\_r_{j\_begin}}\right) -$$

$$\tan^{-1}\left(\frac{\sum_{i=i\_end+1}^{i\_end+10}(y\_m_i^{rot}) - \sum_{i=i\_begin-10}^{i\_begin-1}(y\_m_i^{rot})}{\sum_{i=i\_end+1}^{i\_end+10}(x\_m_i^{rot}) - \sum_{i=i\_begin-10}^{i\_begin-1}(x\_m_i^{rot})}\right)$$

where $\alpha\_rot$ is the angle between the two paths and j_begin and j_end the indices for the first and last positions, respectively, in the reference path, and i_begin and i_end are the indices for the first and last positions, respectively, in the measured path. By measuring several position samples (x_m,y_m,z_m) when the robot is not moving at the beginning and at the end of the path, formation of mean values over several samples (in this case 10, the root indicating that these positions are used for calculating the rotation) may be made to increase the accuracy. Instead of using positions at the beginning and at the end of the path, two positions at two other locations of the path may be selected, defined by two different path indices.

Now, path data, that is, all the positions of the path, may be moved by rotation by means of matrix multiplication according to:

$$\begin{bmatrix} x^{rot} \\ y^{rot} \\ z^{rot} \end{bmatrix} = \begin{bmatrix} \cos(\alpha\_rot) & -\sin(\alpha\_rot) & 0 \\ \sin(\alpha\_rot) & \cos(\alpha\_rot) & 0 \\ 0 & 0 & 1 \end{bmatrix} \begin{bmatrix} x \\ y \\ z \end{bmatrix}$$

Thereafter, step two may be executed and the translation be calculated as follows:

$$\begin{cases} x\_trans = \dfrac{\underset{j}{\text{Max}}[x\_r_j] - \underset{i}{\text{Max}}[x\_m_i^{rot}] + \underset{j}{\text{Min}}[x\_r_j] - \underset{i}{\text{Min}}[x\_m_i^{rot}]}{2}; \\ \qquad\qquad 1 < j < Nj; 1 < i < Ni \\ y\_trans = \dfrac{\underset{j}{\text{Max}}[y\_r_j] - \underset{i}{\text{Max}}[y\_m_i^{rot}] + \underset{j}{\text{Min}}[y\_r_j] - \underset{i}{\text{Min}}[y\_m_i^{rot}]}{2}; \\ \qquad\qquad 1 < j < Nj; 1 < i < Ni \end{cases}$$

where x_trans and y_trans define the necessary translation, Nj the total number of reference samples and Ni is the total number of measured-data samples, and the notation rot implies that the measured data are rotated according to the rotational formula above. In this case, thus, the translation values are calculated with the aid of the maximum and minimum values in the x- and y-directions of the two paths. To reduce the effect of noise on the maximum and minimum values, these may be calculated as maximum and minimum values of mean values of two or more adjacent positions on the path. Mean values around positions with a given path index may, of course, also be used for calculating the translation.

The finishing shape correction in step 3 is calculated as follows:

$$\begin{bmatrix} x\_form_j \\ y\_form_j \\ z\_form_j \end{bmatrix} = \overline{X}_e\left(\left(\begin{bmatrix} x\_r_j \\ y\_r_j \\ z\_r_j \end{bmatrix} - \begin{bmatrix} x\_m_i^{rot} \\ y\_m_i^{rot} \\ z\_m_i^{rot} \end{bmatrix} - \begin{bmatrix} x\_trans_i \\ y\_trans_i \\ z\_trans_i \end{bmatrix}\right) \cdot \overline{X}_e\right)$$

where $x\_form_j$, $y\_form_j$ and $z\_form_j$ are the calculated shape correction for the reference position j, and where $x\_m_i^{rot}$, $y\_m_i^{rot}$ and $z\_m_i^{rot}$ as well as $x\_trans_i$, $y\_trans_i$ and $z\_trans_i$ are the measured data correlating for the respective reference position, and $\overline{X}_a$ is a unity vector along the direction of correction, corresponding to the x-axis.

To carry out a form of filtering of measured data while at the same time counteracting the phenomenon that a perfect matching between the two sampled distance indices is difficult to obtain, a formation of the mean value of the error from the measured-data points nearest the respective reference point may be carried out in step three.

For this shape correction in step three this gives:

$$\begin{cases} x\_form_j = \dfrac{1}{k}\sum(x\_form_{jk}) \\ y\_form_j = \dfrac{1}{k}\sum(y\_form_{jk}) \end{cases}$$

Also an amplification may be introduced in order to improve the stability during iterative path adjustment. In this case, therefore, the calculated correction is multiplied by an amplification factor L, which is normally set at the value 1.

And the total correction is obtained as follows:

$$\begin{cases} x\_corr = ((x\_r^{*rot} - x\_r^*) + x\_trans + x\_form) \cdot L \\ y\_corr = ((y\_r^{*rot} - y\_r^*) + y\_trans + y\_form) \cdot L \end{cases}$$

where $$\begin{cases} x\_r^* = x\_r + x\_corr_{previous\_iteration} \\ y\_r^* = y\_r + y\_corr_{previous\_iteration} \end{cases}$$

With the order of magnitude of the correction which now appears, especially after a couple of iterations, both the repetition accuracy of the robot and the repetition accuracy of the external measuring equipment will play an increasingly more important role. To counteract also this phenomenon to a certain extent, the path in question may be run a number of times with the same correction signal before the path correction for the next iteration is carried out. By means of this, the mean value of the corrections from the respective run may be formed and thereby the stability and the convergence will be further improved.

With this technique, there is formed, for each individual parameter, a mean value of the values obtained from a number of m measured data according to the following.

The rotation in step 1 is now calculated as follows:

$$\alpha\_rot_{mean} = \frac{1}{m}\sum_{j=1}^{m}(\alpha\_rot_j)$$

$$\begin{bmatrix} x^{rot_{mean}} \\ y^{rot_{mean}} \\ z^{rot_{mean}} \end{bmatrix} = \begin{bmatrix} \cos(\alpha\_rot_{mean}) & -\sin(\alpha\_rot_{mean}) & 0 \\ \sin(\alpha\_rot_{mean}) & \cos(\alpha\_rot_{mean}) & 0 \\ 0 & 0 & 1 \end{bmatrix} \begin{bmatrix} x \\ y \\ z \end{bmatrix}$$

The translation in step two is now calculated as follows:

$$\begin{cases} x\_trans = \dfrac{\mathrm{Max}[x\_r_j] - \mathrm{Max}[x\_m_i^{rot_{mean}}] + \mathrm{Min}[x\_r_j] - \mathrm{Min}[x\_m_i^{rot_{mean}}]}{2}; \\ 1 < j < Nj; 1 < i < Ni \\ y\_trans = \dfrac{\mathrm{Max}[y\_r_j] - \mathrm{Max}[y\_m_i^{rot_{mean}}] + \mathrm{Min}[y\_r_j] - \mathrm{Min}[y\_m_i^{rot_{mean}}]}{2}; \\ 1 < j < Nj; 1 < i < Ni \end{cases}$$

$$\begin{cases} x\_trans_{mean} = \dfrac{1}{m}\sum_{j=1}^{m}(x\_trans_j) \\ y\_trans_{mean} = \dfrac{1}{m}\sum_{j=1}^{m}(y\_trans_j) \end{cases}$$

The shape correction according to step three is now finally calculated as follows:

$$\begin{bmatrix} x\_form_j \\ y\_form_j \\ z\_form_j \end{bmatrix} = \overline{X}_e \left( \left( \begin{bmatrix} x\_r_j \\ y\_r_j \\ z\_r_j \end{bmatrix} - \begin{bmatrix} x\_m_i^{rot_{mean}} \\ y\_m_i^{rot_{mean}} \\ z\_m_i^{rot_{mean}} \end{bmatrix} \right) - \begin{bmatrix} x\_trans_{mean} \\ y\_trans_{mean} \\ z\_trans_{mean} \end{bmatrix} \right) \cdot \overline{X}_e$$

$$\begin{cases} x\_form_{mean} = \dfrac{1}{m}\sum_{j=1}^{m}(x\_form_j) \\ y\_form_{mean} = \dfrac{1}{m}\sum_{j=1}^{m}(y\_form_j) \end{cases}$$

And with the introduction of an amplification L, the total correction is obtained as follows:

$$\begin{cases} x\_corr = ((x\_r^{*rot_{mean}} - x\_r^*) + x\_trans_{mean} + x\_form_{mean})L \\ y\_corr = ((y\_r^{*rot_{mean}} - y\_r^*) + y\_trans_{mean} + y\_form_{mean})L \end{cases}$$

where $$\begin{cases} x\_r^* = x\_r + x\_corr_{previous\_iteration} \\ y\_r^* = y\_r + y\_corr_{previous\_iteration} \end{cases}$$

Figure 14:
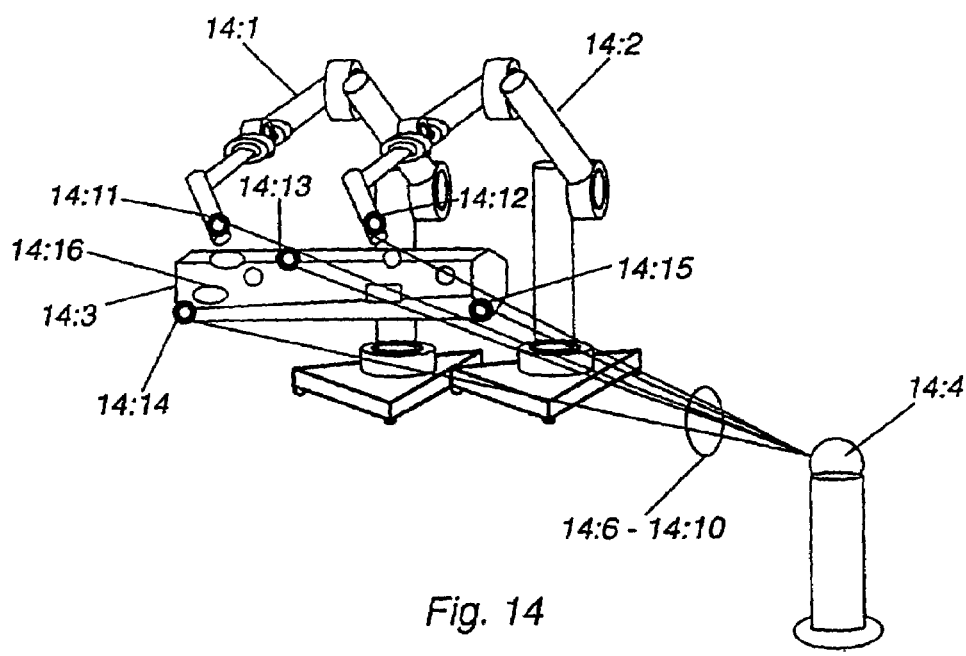
FIG. 14 shows an example of an arrangement including two manipulators and an external measuring system which are used for measuring the movement paths which are used for automatic adjustment of the servo references.

In accordance with the invention, the compensation processes of the static and the low-frequency dynamic error sources are carried out with the aid of an external measuring system 7:1. For this to function also for several robots, global measurements with the external measuring system are required, which is shown in the case of two robots in FIG. 14. The two robots 14:1 and 14:2 machine one and the same object 14:3. The robots shall, for example, cut hole 14:16 in object 14:3 by means of a laser. During installation of the robots, a measuring system 14:4 is placed in front of the robots and the object. First, the position and orientation of the object are measured, and to this end at least three measurement references 14:13–14:15 are mounted at well-defined positions on the object. When these positions are known, the orientations and the positions of the reference paths (e.g. 14:16) on the objects may then be defined in the coordinate system of the measuring system 14:4, or, alternatively, in a coordinate system which is object.

By then mounting measurement references 14:11 and 14:12 at well-defined positions of the tool, the movement of the operating point relative to the reference paths may be measured. The method for compensation of the error sources 1–6 will then automatically adjust the movement of the robot such that the paths of the operating point correspond to the desired paths according to drawings and CAD documentation. It should be noted that this compensation procedure may be made freely in space without the object 14:3 having to be in the cell.

If the measurement references cannot be placed exactly at the operating point, a measurement error may be obtained due to an error in the tool orientation. This error may be compensated for by using three measurement references on the tool, whereby the orientation of the tool may be measured with high accuracy. This arrangement is also necessary if it is desired to make an adjustment of the orientation error with the method described.

Normally, the object is secured by an accurate fixture and to be able to repeat an adjustment of the paths with the method described at a later time after the measuring equipment 14:4 has been moved away from the arrangement, there may be three reference positions on the fixture and these reference positions may be used for measuring the position and orientation of the measuring system. It would also be possible to have three fixed reference points somewhere else in the robot cell, such that it is possible to check that the fixture has not been moved or deformed. These fixed reference points may also be needed if the measuring system cannot manage to measure all the robots in a cell from the same location but has to be moved around in the cell during the adjustment process described above. In that context, the position and orientation of the measuring system are measured relative to the fixed references in the cell after each movement of the measuring system.

It should be added that the method is also useful in so-called room-fixed TCP, whereby the tool is secured to the floor, for example, and the robot manipulates the work object 14:3. In this case, there should be three measurement references on the work object to calculate the path made by the fixed operating point relative to the work object.

The invention claimed is:

1. A method for an industrial robot to increase accuracy in movements of the robot, the method comprising:
    forming a first path comprising a plurality of generated positions;
    directing a tool supported by the robot to assume the plurality of generated positions;
    determining a plurality of observed positions of the tool as the tool is directed to assume the plurality of generated positions;
    forming a second path of the observed tool positions; and
    determining a correction by a path deviation between the observed positions and the generated positions.

2. The method according to claim 1, wherein the path deviation is calculated based on a vector from a first position in the first path to a second position in the second path, wherein the first position and the second position lie substantially opposite to each other.

3. The method according to claim 2, wherein the first position and the second position are extracted from the same path index.

4. The method according to claim 2, wherein the second position lies in a plane normal to a tangent through the first position.

5. The method according to claim 1, wherein calculation of the path deviation comprises:
adapting the second path to adopt the same orientation as the first path;
adapting the oriented second path to adopt the same position as the first path; and
adapting the oriented and translated second path to adopt the same shape as the first path.

6. The method according to claim 1, wherein the path deviation forms the basis for a parameter adjustment for the drive device.

7. The method according to claim 6, wherein the path deviation is calculated from a mean value of the magnitude of the vectors in an interval, arranged along the first path, around a third position.

8. The method according to claim 7, wherein the third position comprises a position where the movement of a drive device changes direction.

9. The method according to claim 1, wherein the first path comprises a circle.

10. The method according to claim 1, wherein corrections are stated as values.

11. The method according to claim 1, wherein the path deviation forms the basis of a reference adjustment.

12. The method according to claim 11, wherein the first path is arranged on the surface of the work object.

13. The method according to claim 1, wherein the first path is adapted to form a reference path and the second path is adapted to form an outcome path.

14. The method according to claim 1, wherein the adjusted values form the basis of a new outcome path, whereupon the method is repeated for the new outcome path.

15. Use of a method according to claim 1 for increasing the accuracy of movement in an industrial robot during laser machining.

16. A control system for an industrial robot comprising:
a program module;
an interpreter module;
a trajectory generator;
a module for inverse kinematics;
a servo;
an axis-angle measurer;
a measuring module;
a module for calculation of path deviation, which receives data from the trajectory generator and from the measuring module.

17. The control system according to claim 16, wherein the measuring module comprises a module for direct kinematics and wherein the control system further comprises a module for parameter adjustment, which receives and machines results from the module for calculating the path deviation.

18. The control system according to claim 16, wherein the module for calculating the path deviation comprises a binary search method, the control system further comprising:
a friction compensator, via a friction model, receives the result from the calculation of the path deviation.

19. The control system according to claim 16, wherein the measuring module comprises an external measuring system, the control system further comprising:
a module for adjusting the reference path in the trajectory generator.

20. Use of a control system according to claim 16 for increasing the accuracy of movement in an industrial robot during laser machining.

21. A computer program, comprising:
a computer readable medium; and
instructions recorded on the computer readable medium for influencing a processor to control a robot, for increasing the accuracy in the movements of the robot, the instructions for carrying out the steps of
forming a first path comprising a plurality of generated positions, directing a tool supported by the robot to assume the plurality of generated positions,
determining a plurality of observed positions of the tool as the tool is directed to assume the plurality of generated positions,
forming a second path of the observed tool positions, and
determining a correction by a path deviation between the observed positions and the generated positions.

22. The computer program according to claim 21, wherein the instructions further comprise:
calculating the path deviation based on a vector from a first position in the first path to a second position in the second path, whereby the second position is adapted to lie in a normal plane to a tangent through the first position.

23. The computer program according to claim 21, wherein the instructions further comprise:
carrying out the calculation of the path deviation in a first step, in which the second path is adapted to adopt the same orientation as the first path, a second step, in which the thus oriented second path is adapted to adopt the same position as the first path, and a third step, in which the thus oriented and translated second path is adapted to adopt the same shape as the first path.

24. The computer program according to claim 21, provided at least partly over a network such as the Internet.

25. A method to increased accuracy in movements of an industrial robot, the method comprising:
forming a predefined path comprising a plurality of generated positions;
directing a tool supported by the robot to assume the plurality of generated positions;
determining a plurality of observed positions of the tool as the tool is directed to assume the plurality of generated positions;
forming an actual tool path of the observed tool positions;
determining a path deviation between the actual tool path and the predefined path; and
determining at least one correction that will result in bringing the actual tool path closer to the predefined path.

26. The method according to claim 25, wherein the correction adjusts at least one of an orientation, position and shape of the actual tool path.

* * * * *